United States Patent [19]

Grajnert

[11] 4,044,494
[45] Aug. 30, 1977

[54] TRAP FOR FLYING INSECTS AND BUGS

[76] Inventor: Zbigniew Grajnert, P.O. Box BM, Marco Island, Fla. 33937

[21] Appl. No.: 668,692

[22] Filed: Mar. 19, 1976

[51] Int. Cl.² .......................................... A01M 1/24
[52] U.S. Cl. .................................................. 43/119
[58] Field of Search ................................ 43/107, 119

[56] References Cited

U.S. PATENT DOCUMENTS

| 185,724 | 12/1876 | Carroll | 43/119 |
|---|---|---|---|
| 618,370 | 1/1899 | Allen | 43/119 |
| 1,475,357 | 11/1923 | Weber | 43/119 |

Primary Examiner—Louis G. Mancene
Assistant Examiner—Daniel J. Leach

[57] ABSTRACT

A trap for flying insects and bugs, particularly of the relatively small varieties such as mosquitoes, sand flies, gnats, etc. The trap generally comprises a housing defining an interior chamber, one or more of the walls being slotted with inwardly turned, converging flanges along the slot edges. The inner edges of the flanges are provided with a fabric tape of a material such as nylon with inwardly directed frayed warp strands in a manner so as to permit the entry of the flying insects and bugs into the chamber while preventing their exit therefrom. The housing is fabricated of a clear transparent material to reflect light into the interior chamber and, in addition, a reflective material may be applied to some or all of the flanges.

15 Claims, 5 Drawing Figures

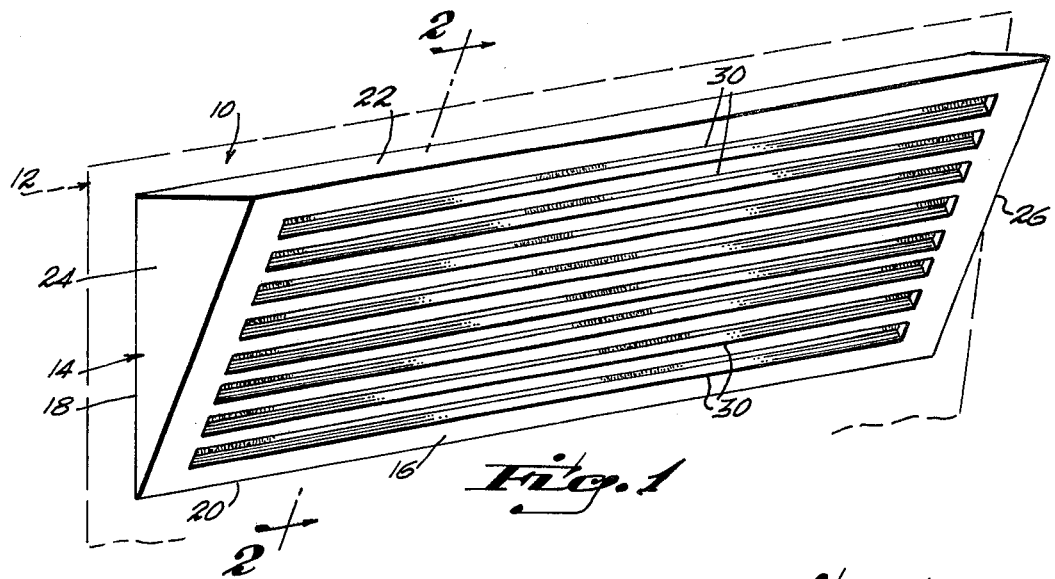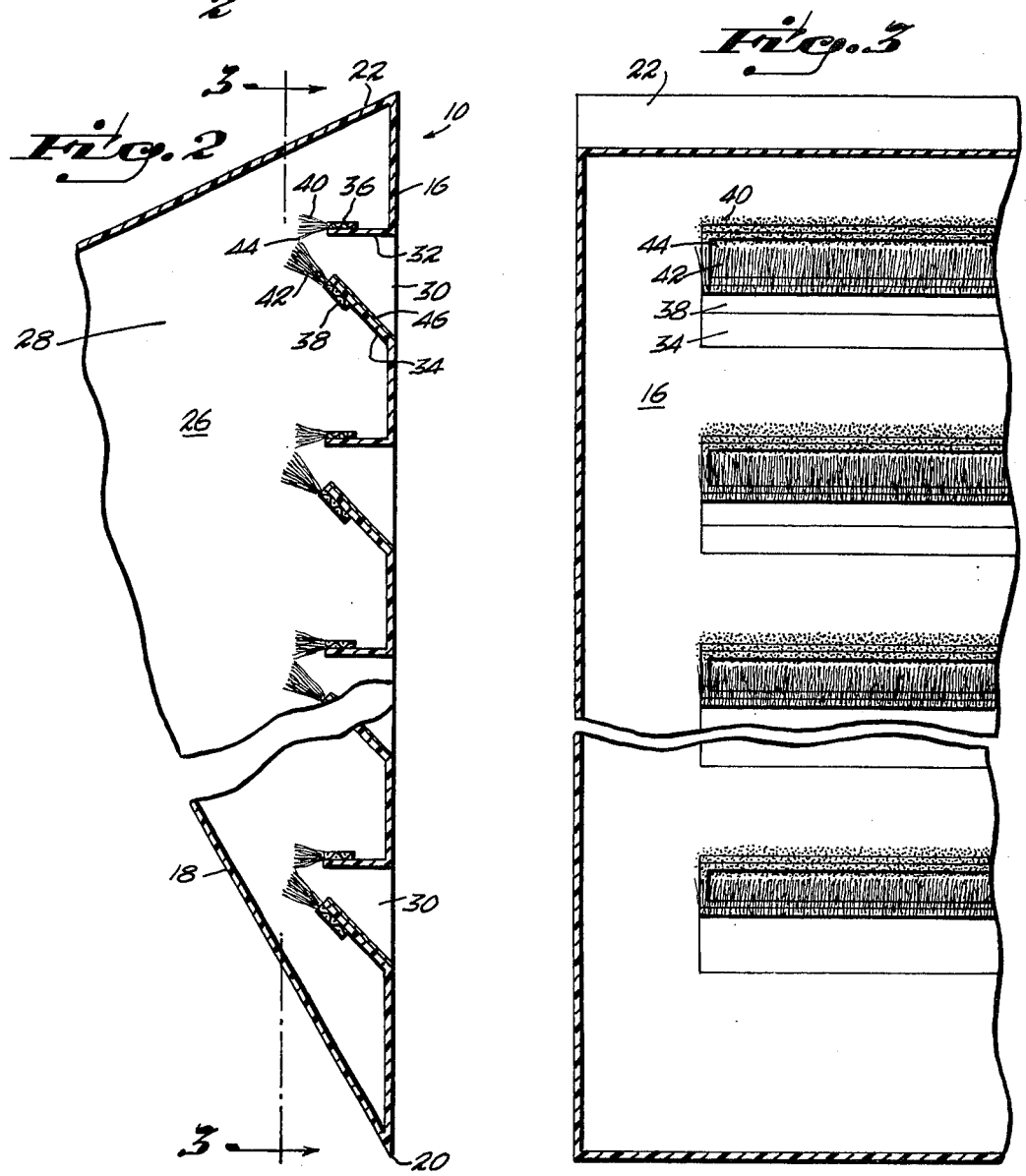

TRAP FOR FLYING INSECTS AND BUGS

FIELD OF THE INVENTION

This invention pertains to a trap for flying insects and bugs, particularly of the relatively small varieties such as mosquitoes, sand flies, gnats, etc. which are attracted to light or light reflective materials. It may be strategically located relative to windows, glass doors, light fixtures and lamps, etc. which normally attract flying insects and bugs.

OBJECTS AND ADVANTAGES OF THE PRESENT INVENTION

One of the principal objects of the present invention is to provide a trap for flying insects and bugs which takes advantage of their natural attraction to bright lights and light reflective materials.

Another principal object of this invention is to provide a housing, defining an interior chamber, constructed of a clear, transparent, light reflective material.

A further object of the instant invention is to provide a plurality of elongated slots in the housing, including means to permit entrance of the insects and bugs into the interior chamber defined by the housing while preventing their exit therefrom.

Yet another object of the present invention is to provide inwardly converging flanges along the top and bottom edges of each slot with a fabric tape material fixed therealong with inwardly converging frayed warp strands to permit the entrance of flying insects and bugs into the inner chamber while preventing their escape therefrom.

BRIEF DESCRIPTION OF THE DRAWINGS

FIG. 1 is a perspective view of a first preferred form of flying insect and bug trap of the present invention;

FIG. 2 is an enlarged, fragmentary cross sectional view taken along line 2—2 of FIG. 1;

FIG. 3 is a fragmentary, longitudinal sectional view taken along line 3—3 of FIG. 2;

DETAILED DESCRIPTION OF THE DRAWINGS

Figure 4:
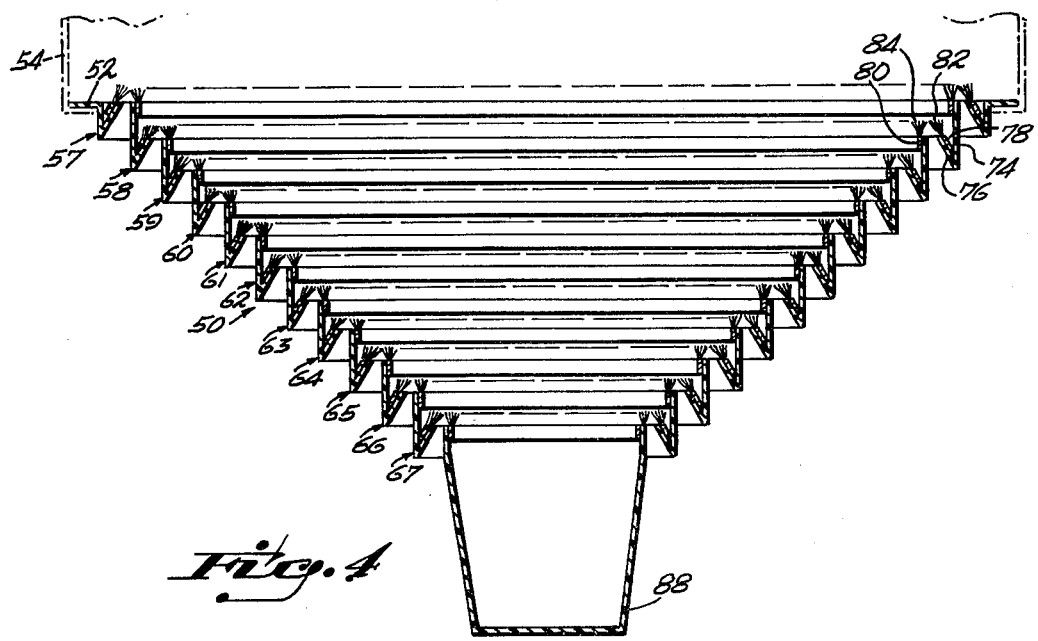
FIG. 4 is a vertical cross sectional view through a second preferred form of the present invention.

With reference to the drawings in which like reference characters designate like or corresponding parts throughout the various views, and with particular reference to FIGS. 1 and 2, one preferred form of the present invention is indicated generally at 10, mounted in any conventional manner relative to a window or glass door 12. In the form illustrated, the housing 14 is generally triangular in cross sectional configuration, including a front wall 16 and a back wall 18, converging to a bottom edge 20. The top edges of the front and back walls 16 and 18 are interconnected by a top wall 22. Opposed end closure walls 24 and 26 complete the enclosure to define an interior chamber 28.

Front wall 16 is provided with a plurality of spaced apart slots 30, substantially along its length, the slots being preferably disposed in a parallel, longitudinal relation.

As best illustrated in FIG. 2, a top ledge or flange 32 is turned inwardly from and along the length of the top edge of each slot 30 at approximately 90 degrees. A lower flange 34 is turned inwardly from and along the length of the lower edge of each slot 30 at approximately 45 degrees. Consequently, the upper and lower flanges 32 and 34 define an inwardly converging pattern in cross section.

Fabric tapes 36 and 38 are secured as by a suitable adhesive along the inner edge portions of the respective upper and lower flanges 32 and 34. Frayed warp strands 40 and 42 extend inwardly beyond the inner edges of flanges 32 and 34. The tapes 36 and 38 and their associated frayed warp strands are preferably formed of nylon. Because of the inwardly converging disposition of flanges 32 and 34, the frayed warp strands converge to a point where a very narrow slit 44, in the nature of one-half mm, exists between the extended ends thereof. A highly reflective tape material such as an aluminum foil may be applied to one or both faces of the lower and/or upper flanges 32 and 34. As illustrated a reflective tape 46 is applied to the outer face of lower flange 34. The reflective tape attracts flying insects and bugs. In its preferred form the entire housing is fabricated from a clear, transparent synthetic material such as plexiglas to obtain the greatest degree of direct and reflected light.

The general shape, size, disposition of the slot structures and the number of walls provided with slot structures as above described may vary.

Figure 5:
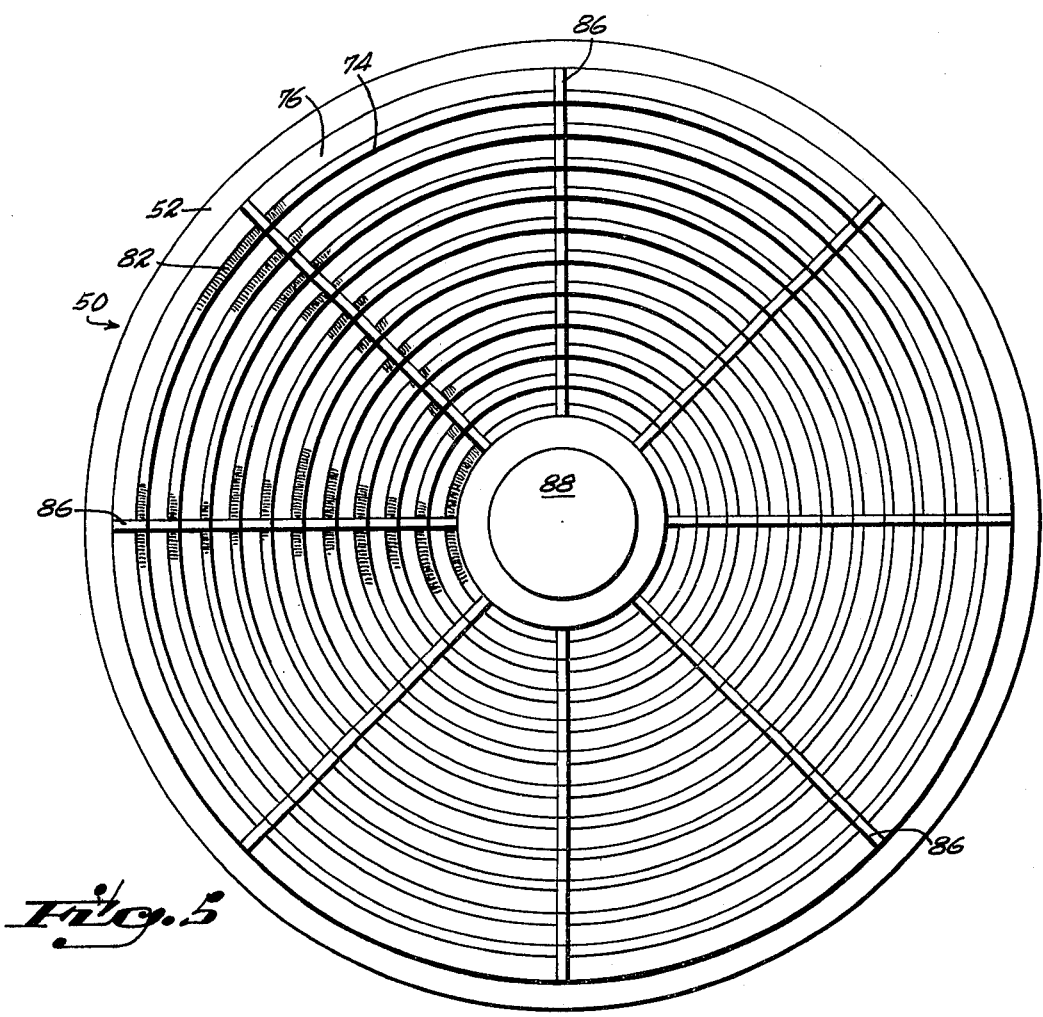
FIG. 5 is a bottom plan view of the form of the invention illustrated in FIG. 4.

With particular reference to the modified form of the invention, illustrated in FIGS. 4 and 5, the housing 50 is generally of an inverted conical configuration with a top peripheral flange 52 for fixed engagement with the attachment ring 54 of a light fixture in the same manner as conventional light fixture globes. The housing 50 is adapted for attachment to existing street lamps, outside house lights, patio lamps, etc., in a surrounding relation to the light bulbs therein.

The housing 50 is formed of a progression of angle rings 57 through 67, of symmetrically diminishing radii, spaced apart to define a generally conical configuration. Each ring includes an outer, generally vertical wall 74 and an inwardly, acutely angled flange 76. The angled flange 76 of each ring and the inner end portion of the vertical wall 74 of the next inwardly adjacent angle ring define a slot structure similar to the slots 30 and inwardly converging flanges 32 and 34 of the form of the invention illustrated in FIGS. 1, 2 and 3. In like manner tapes 78 and 80 with inwardly converging frayed warp strands 82 and 84 are provided on each adjacent vertical wall 74 and angle flange 76.

The plurality of angle rings 57 through 67 are integrally interconnected by a plurality of spaced apart struts 86 as seen in FIG. 5. A cup-shaped container 88 for collecting dead insects and bugs is provided at the bottom apex of the housing 50. Preferably, the container 88 is removably slip fitted into place between the lower ends of the struts 86 or otherwise removably attached in place. Aluminum foil tape may also be applied to the angle rings 57 through 67.

A very substantial number of different shapes and sizes of housing structures 50 may be provided. For example, they may take the form of three or four sides, inverted pyramids as well as many other decorative designs without departing from the true spirit of the invention.

In use, the trap of the present invention will trap and kill flying insects and bugs drawn by a light source inwardly through a slit such as 44 in the frayed warp strands. They will in effect be "going with the grain."

However, if the insects and bugs attempt to exit from the trap they will be "going against the grain," the extremely fine and flimsy frayed strands will bend and close the slit 44.

What is claimed is:

1. A trap for flying insects and bugs comprising:
   a housing formed of a clear, transparent material, defining an interior chamber,
   a slot means in said housing, opening into said interior chamber and defining confronting edges,
   inwardly converging flange means along said confronting edges,
   tape means fixed along said converging flange means, providing inwardly converging frayed warp strands along their lengths;
   said trap including a highly reflective tape as of aluminum foil fixed along at least one surface of said flange means.

2. The trap as defined in claim 1 wherein said tape means is formed of a synthetic material such as nylon.

3. The trap as defined in claim 1 wherein said housing is generally triangular in vertical cross section and is comprised of front, back, top and opposed end walls.

4. The trap as defined in claim 3 wherein said slot means comprises a plurality of spaced apart, longitudinally extending slots, substantially along the length of said front wall.

5. The trap as defined in claim 4 wherein said inwardly converging flange means comprises a top flange turned inwardly, substantially at right angles to said front wall, along a top edge of each of said slots, and a bottom flange turned inwardly, substantially at 45°, to the plane of said front wall along a bottom edge of each of said slots.

6. The trap as defined in claim 5 wherein said tape means comprises a first length of tape fixed along the length of each of said top flanges and a second length of tape fixed along the length of each of said bottom flanges.

7. The trap as defined in claim 6 wherein said inwardly converging frayed warp strands from said top and bottom tapes are of such lengths so as to define a very narrow open slit between their extended ends.

8. A trap for flying insects and bugs comprising:
   a housing formed of a clear, transparent material, defining an interior chamber,
   slot means in said housing, opening into said interior chamber and defining confronting edges,
   inwardly converging flange means along said confronting edges,
   tape means fixed along said converging flange means, providing inwardly converging frayed warp strands along their lengths;
   said housing being formed of a geometric progression of continuous angle members, of like configuration in plan such as round, triangular or square, said angle members being symmetrically, downwardly displaced, relative to each other, and diminishing in size from a top, largest angle member to a bottom, smallest angle member defining said slot means.

9. The trap as defined in claim 8 including a downwardly extending, removable, cup-shaped bottom enclosure from the bottom, smallest angle member.

10. The trap as defined in claim 8 wherein said angle members are interconnected by a plurality of spaced apart struts.

11. The trap as defined in claim 10 wherein said top, largest angle member includes an outwardly extending flange for connection to an existing light fixture.

12. The trap as defined in claim 11 wherein each of said continuous angle members is comprised of an outer, generally vertically extending flange and an inner acutely angled flange.

13. The trap as defined in claim 11 wherein said slot means comprises a slot defined between each adjacent pair of angle members.

14. The trap as defined in claim 13 wherein said inwardly converging flange means comprises the inner acutely angled flange of one of said angle members and the outer vertically extending flange of the next inwardly adjacent angle member.

15. The trap as defined in claim 14 wherein said tape means comprises a first length of tape fixed along the length of each of said acutely angled flanges and a second length of tape fixed along the length of each of said vertical flanges.

* * * * *